US007212346B2

(12) United States Patent
Krause

(10) Patent No.: US 7,212,346 B2
(45) Date of Patent: May 1, 2007

(54) CONTINUOUS LENTICULAR IMAGE LABEL WEB

(75) Inventor: Donald R. Krause, Lomira, WI (US)

(73) Assignee: National Graphics, Inc., Brookfield, WI (US)

( * ) Notice: Subject to any disclaimer, the term of this patent is extended or adjusted under 35 U.S.C. 154(b) by 0 days.

(21) Appl. No.: 11/026,537

(22) Filed: Dec. 30, 2004

(65) Prior Publication Data

US 2006/0146410 A1 Jul. 6, 2006

(51) Int. Cl.
*G02B 27/10* (2006.01)

(52) U.S. Cl. ........................................ 359/619

(58) Field of Classification Search ........ 359/619–621, 359/625–626, 580–582; 428/42.3; 425/335
See application file for complete search history.

(56) References Cited

U.S. PATENT DOCUMENTS 4,406,189 A 9/1983 Neefe .......................... 82/1 C
5,108,531 A 4/1992 Quadracci ................... 156/277
5,181,745 A 1/1993 Jacobsen et al. .............. 283/94
5,266,995 A 11/1993 Quadracci et al. ............ 355/77
5,285,238 A 2/1994 Quadracci et al. ............ 355/77
5,301,981 A 4/1994 Nesis
5,457,515 A 10/1995 Quadracci et al. .......... 355/132
5,519,794 A 5/1996 Sandor et al. .............. 382/285
5,560,799 A 10/1996 Jacobsen .................... 156/277
5,687,024 A 11/1997 Yoshimura et al. ......... 359/455
5,724,188 A 3/1998 Kumagai et al. ........... 359/619
5,753,344 A 5/1998 Jacobsen .................... 428/142
5,896,230 A 4/1999 Goggins ..................... 359/619
5,924,870 A 7/1999 Brosh et al. ................ 434/365
5,967,032 A 10/1999 Bravenec et al. ........... 101/211
5,974,967 A 11/1999 Bravenec et al. ........... 101/211
6,084,713 A 7/2000 Rosenthal ................... 359/619
6,101,031 A 8/2000 Yoshimura et al. ......... 359/456
6,153,039 A 11/2000 Jacobsen .................... 156/277
6,157,491 A 12/2000 Watanabe et al. ........... 359/619
6,237,264 B1 5/2001 Gulick, Jr. ................... 40/454
6,258,194 B1 7/2001 Danon
6,373,636 B1 4/2002 Conley ....................... 359/619
6,424,467 B1 7/2002 Goggins ..................... 359/626
6,596,361 B2 7/2003 Klein et al. ................ 428/42.3
6,624,946 B2 9/2003 Franko, Sr. ................. 359/619
6,741,395 B1 5/2004 Johnson ...................... 359/619
6,795,250 B2 9/2004 Johnson et al. ............. 359/626
6,833,961 B2 12/2004 Johnson et al. ............. 359/691
2002/0134495 A1 9/2002 Franko, Sr. ................. 159/209
2002/0135873 A1 9/2002 Franko, Sr. ................. 359/463
2003/0002160 A1 1/2003 Johnson et al. ............. 359/619
2004/0105948 A1* 6/2004 Kiraly et al. .............. 428/40.1
2004/0136079 A1 7/2004 Goggins ..................... 359/619

* cited by examiner

*Primary Examiner*—Alicia Harrington
(74) *Attorney, Agent, or Firm*—Whyte Hirschboeck Dudek SC

(57) ABSTRACT

Described in this application is a method of making a continuous lenticular image label web and a process for making a plurality of lenticular labels using a continuous lenticular image label web. In addition, a continuous lenticular image label web is described and detailed. Several advantages accrue from the methods described, including reduced time and cost to manufacture lenticular image labels. Advantageously, on-serting of lenticular labels is not required.

12 Claims, 5 Drawing Sheets

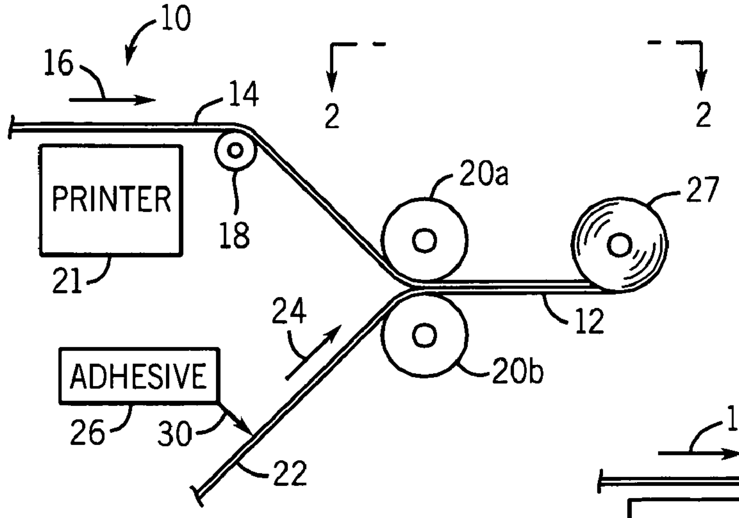
FIG. 1A
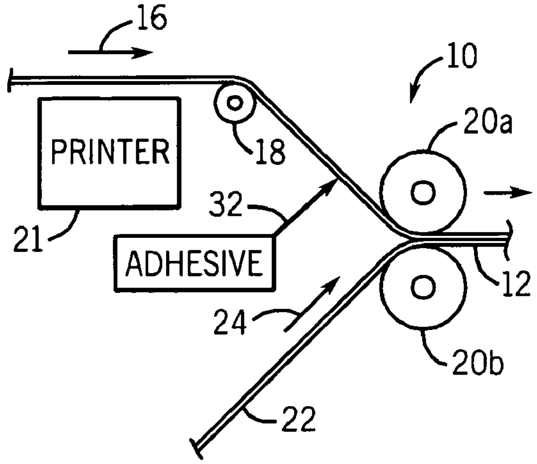
FIG. 1B
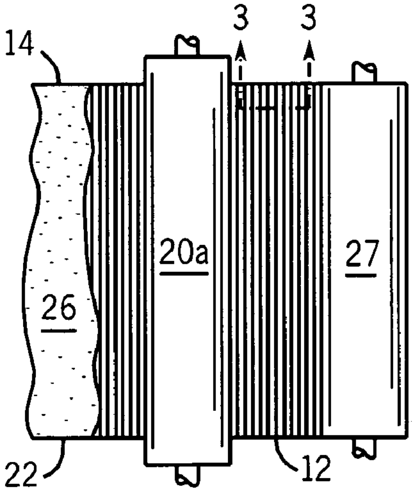
FIG. 2
FIG. 3
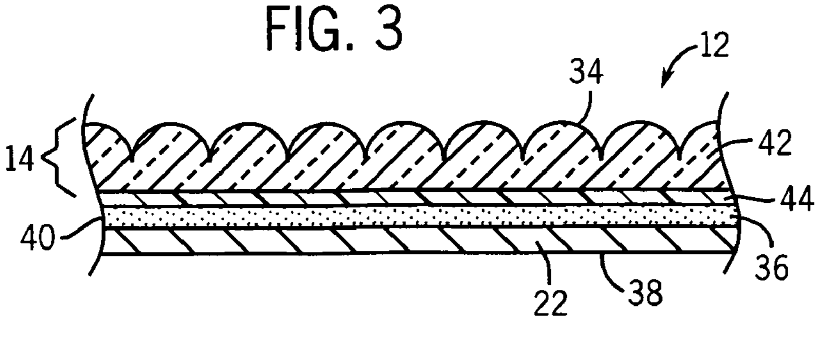

FIG. 4
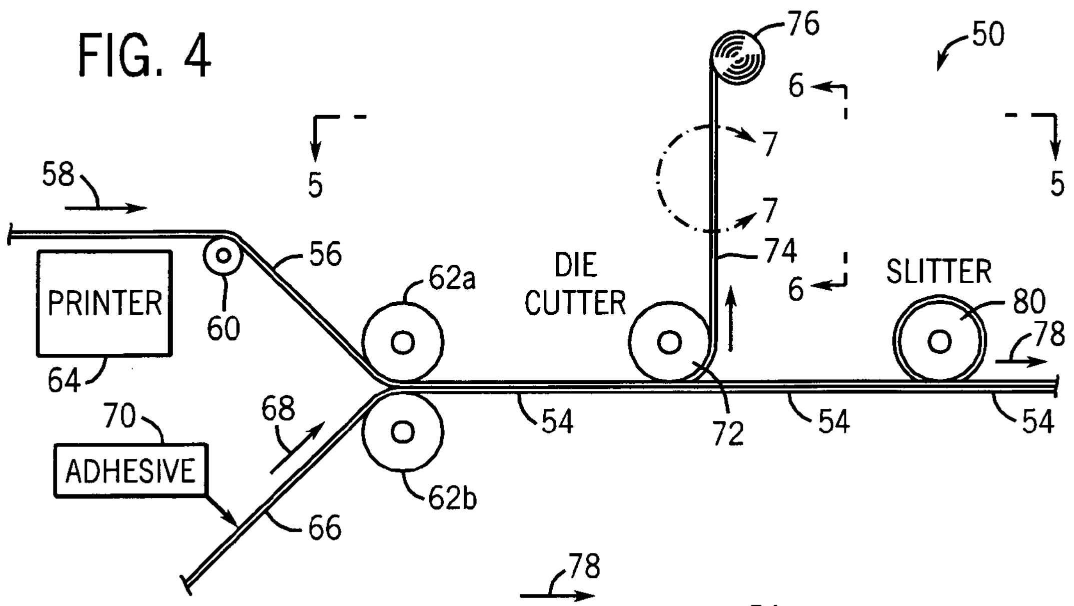
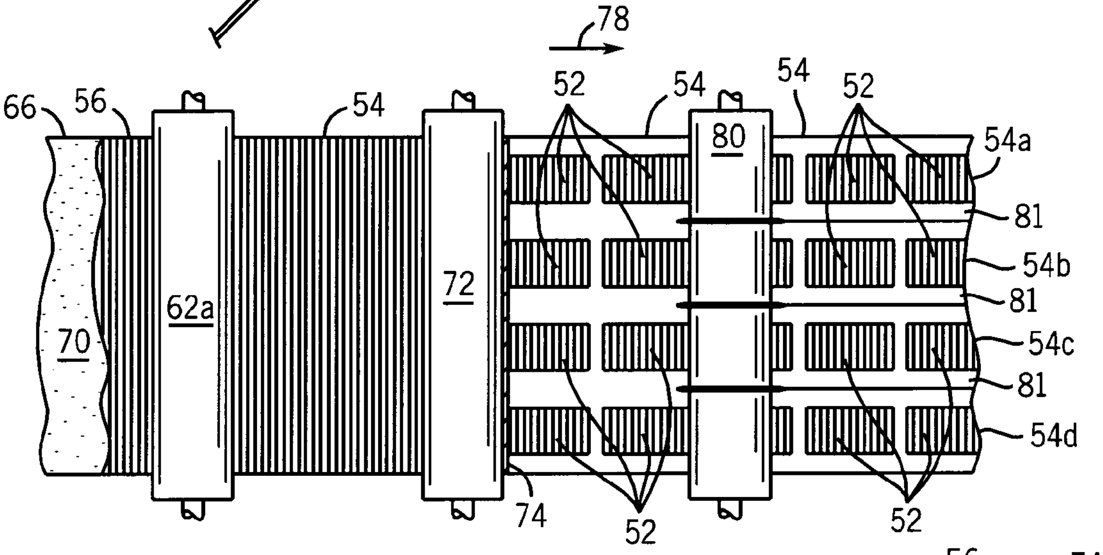
FIG. 5
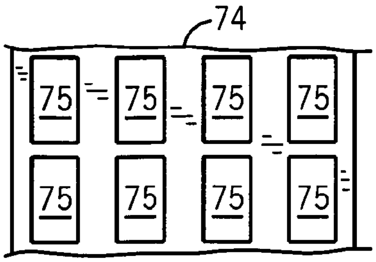
FIG. 6
FIG. 7
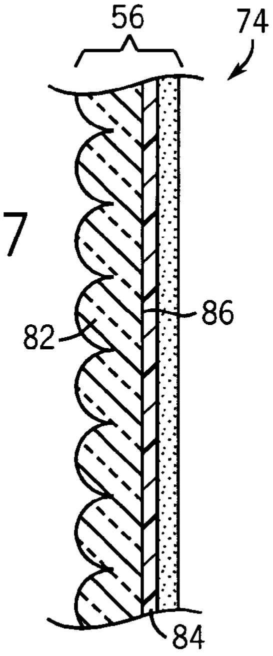

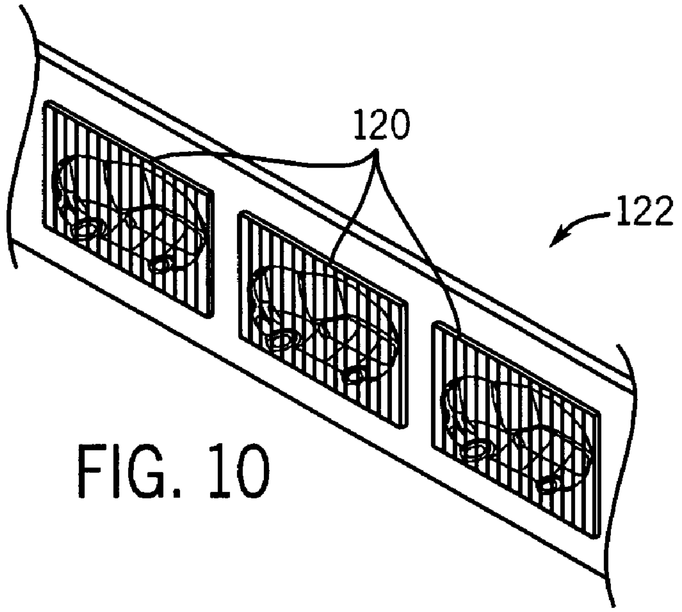
FIG. 10
FIG. 11
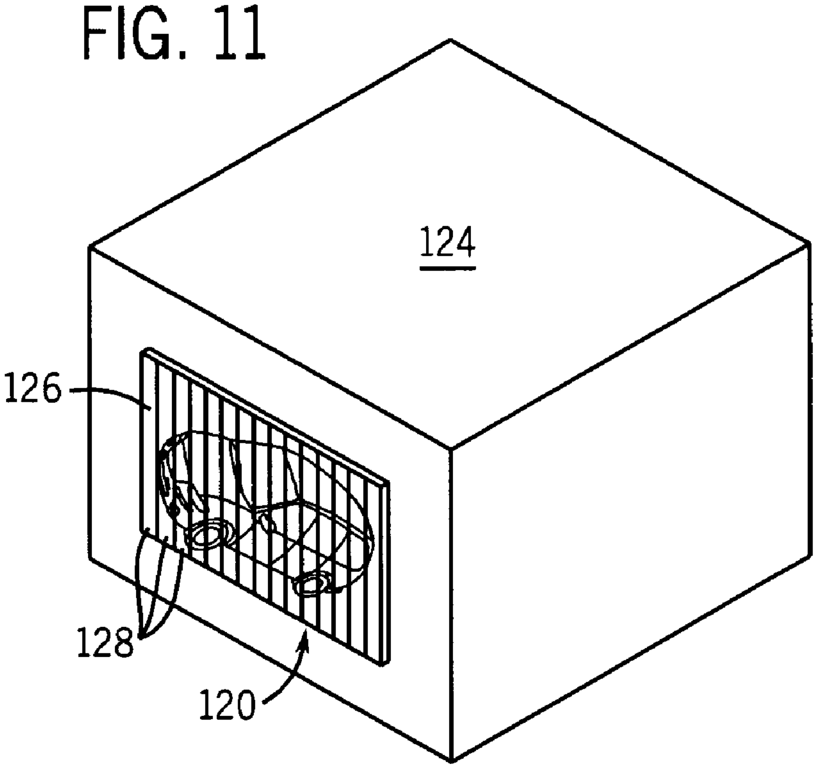

CONTINUOUS LENTICULAR IMAGE LABEL WEB

FIELD OF THE INVENTION

The present invention relates generally to labels and more particularly to lenticular image labels. In one aspect, the invention relates to a continuous lenticular image label web. In another aspect, the invention relates to a method of manufacturing the continuous lenticular image label web. And in yet another aspect, the invention relates to the production of individual or discrete lenticular image label created from the continuous lenticular image label web.

BACKGROUND OF THE INVENTION

Lenticular lenses take the form of a transparent plastic sheet or web. On one side, the sheet or web typically includes an array of identical curved or ribbed surfaces that are formed (e.g., cast, coated, embossed, extruded, or co-extruded) on the front surface of the plastic sheet. The back surface of the lens is typically flat. Each lenticular or individual lens is a section of a long cylinder that focuses on, and extends over, substantially the full length of an underlying image. Other lens shapes or profiles are possible (for instance, elliptical, pyramidal, trapezoidal, parabolic, and the like). The lenticular lens is generally selected to accommodate both the interlaced image and the distance from which the image will ordinarily be viewed. Various types of lenses are commercially available.

A lenticular image comprises an interlaced precursor image that is joined to a lenticular lens in any of a variety of alternative ways (described further below). The preparation of an interlaced image is well known in the art. The interlaced image is a composite of two or more component images that are themselves preferably of photographic quality. The component images are selected based upon the desired features of the lenticular or final image (e.g., one or more of the following: zoom, flip, morph, motion). Component images are then arranged, segmented, interlaced and mapped to create the precursor image so that the precursor image corresponds with the lenticular lens to which it will be joined. In order to impart the illusion of depth and/or motion, the interlaced image is made from more than one picture or frame. Typically, four pictures are interlaced with one another in any desired sequence to form a composite image or picture that when viewed through the lenticular lens, imparts the illusion of depth and/or motion to the viewer. In order to impart the illusion of depth and/or motion to the viewer, the interlaced image must be "in phase", or correspond with, the lenticules of the lens.

The interlaced image is typically printed to the flat back surface of the lenticular lens sheet or web. However, it is not uncommon to first print the interlaced image to a substrate (e.g., paper, plastic, metal, glass or wood) and then join, for example using an adhesive, the substrate bearing the image to the lenticular lens (i.e., thereby creating the lenticular image).

Today, lenticular technology is in use on a variety of items, such as: promotional buttons, magnets, coasters, collectibles, display posters, signs, menu boards, postcards and business cards. Lenticular technology is also used in packaging, publishing and labeling applications.

Lenticular lens material can be extruded, cast or embossed. The manufacture of lenticular lens material is a highly specialized process that typically involves the use of a precisely made lenticular pattern-forming device (e.g., an engraved cylinder or pattern roll). The device includes a groove pattern on its outer surface and this groove pattern is utilized to impart a lenticular profile (i.e., the array of lenticules or lenses). For example, when a plastic material (in the form of, for example, a sheet, web or film) is pressed against the groove pattern, the plurality of lenticules, which make up a lenticular pattern, are formed on a surface of the plastic material. In this way, a lenticular pattern is formed in the sheet or web that corresponds to the groove pattern.

More specifically, when the pattern-forming device includes grooves that are oriented to be parallel to its central longitudinal axis, the resultant lenticular lens material includes lenticules that run transverse to the length-wise direction of the lens material as it passes the device, and thus, such a pattern-forming device can be referred to as a "transverse pattern-forming device". When lenticular lens product is manufactured in this fashion, printing and finishing operations (e.g., cutting, laminating, etc.) can be achieved or accommodated in-line with the manufacture of the lens web. Moreover, various end-use applications of the lens (e.g., lenticular image labeling) can be facilitated using lenticular lens manufacturing in web format, and in particular, lenticular lens made using a transverse pattern-forming device. Application Ser. No. 10/340,075, which is incorporated herein by reference, describes one such lenticular lens pattern-forming device for producing a lenticular lens web.

U.S. Pat. No. 6,596,361 to Klein teaches a process for forming lenticular labels on a continuous web so that the lenticules are perpendicular to the longitudinal axis of the web. The process includes the steps of: advancing a continuous web of label stock including an adhesive on both sides; providing multiple sheets of lenticular assemblies; and securing the sheets of lenticular assemblies to one side of the continuous web with the lenticules of the lenticular assemblies oriented perpendicularly to the length of the continuous web. One disadvantage associated with the teachings of Klein is that the method requires labels to be "on-serted", or placed on to, a web of label material so as to achieve the ultimate desired orientation of the lenticular image label. In effect, an additional layer of material (i.e., the web of label material) is required to create a desired lenticular image label.

Accordingly, it would be desirable to provide a continuous lenticular image label web, as well as a method of manufacturing the continuous lenticular image label web. It would be desirable to create individual or discrete lenticular image labels out of the continuous lenticular image label web. The continuous lenticular image label web could advantageously be created in-line with printing and other operations consistent with web-lenticular format. The overall construction of the continuous lenticular image label web, as well as its resultant lenticular image labels, could be simplified. For example, it would be desirable to eliminate various layers (e.g., adhesive layers, or a label carrier layer), for example by eliminating the need for on-serting, so as to reduce the cost and time to manufacture the lenticular image labels.

BRIEF SUMMARY OF THE INVENTION

A method of making a continuous lenticular image label web and a process for making a plurality of lenticular labels using a continuous lenticular image label web. In addition, a continuous lenticular image label web is described and detailed. The method of creating a plurality of lenticular image labels from a continuous lenticular image label web comprises: providing a continuous label release liner having a top surface and a bottom surface; providing a continuous lenticular image web; joining the continuous lenticular image web to at least one of the top surface and the bottom surface of the continuous release liner, thereby creating a continuous lenticular image label web; and cutting at least one of the continuous lenticular image web and continuous lenticular image label web to create the plurality of lenticular image labels.

Various other features, objects and advantages of the present invention will be made apparent from the following detailed description and the drawings.

BRIEF DESCRIPTION OF THE DRAWINGS

Preferred embodiments of the invention are described below with reference to the following drawings, which are provided for illustrative purposes only. The drawings illustrate a best mode presently contemplated for carrying out the invention.

In the drawings:

FIG. 1A is a schematic side view of a system for producing a continuous lenticular image label web according to one aspect of the present invention;

FIG. 1B is a schematic side view similar to that of FIG. 1A of a system for producing a continuous lenticular image label web according to another aspect of the present invention;

FIG. 2 is a top view taken along line 2—2 of FIG. 1A;

FIG. 3 is a cross-sectional view of a continuous lenticular image label web according to one aspect of the present invention taken along line 3—3 of FIG. 2;

FIG. 4 is a schematic side view of a system for producing a plurality of lenticular image labels from a continuous lenticular image label web according to one aspect of the present invention;

FIG. 5 is a top view taken along line 5—5 of FIG. 4;

FIG. 6 is a side view taken along line 6—6 of FIG. 4;

FIG. 7 is a cross-sectional view taken along line 7—7 of FIG. 4;

FIG. 10 is a perspective view of a plurality of lenticular image labels created from a continuous lenticular image label web according to one aspect of the present invention; and FIG. 11 is a perspective view of a product having a lenticular image label created from a continuous lenticular image label web according to one aspect of the present invention.

DETAILED DESCRIPTION OF THE INVENTION

Figure 4A:
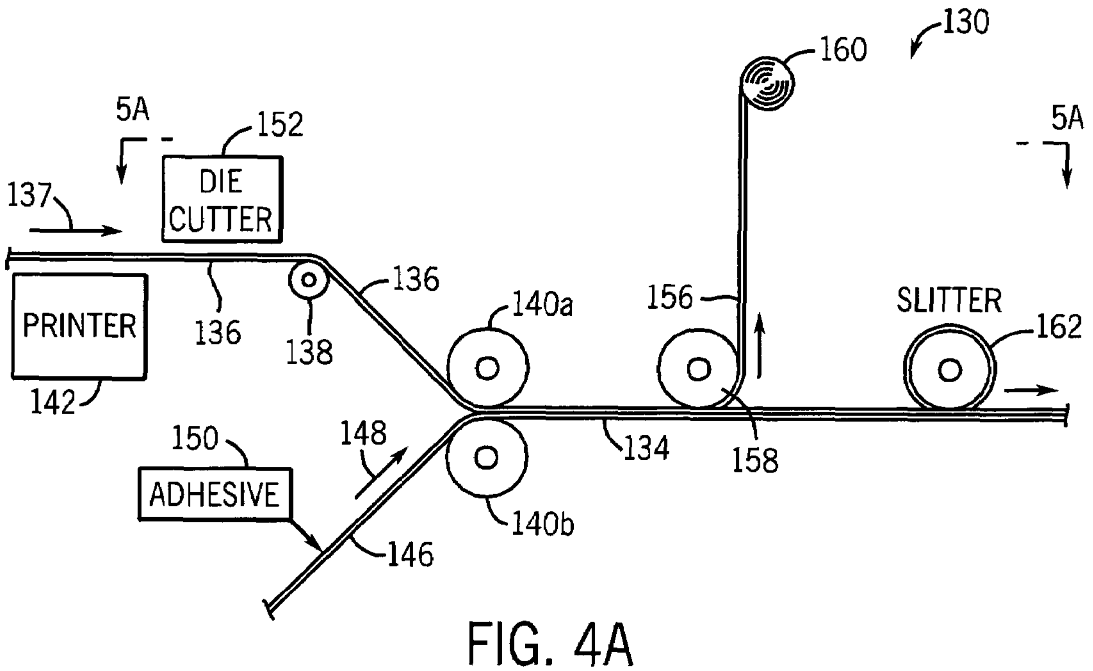
FIG. 4A is a schematic side view of a system for producing a plurality of lenticular image labels from a continuous lenticular image label web according to another aspect of the present invention.

In the following detailed description, references are made to the accompanying drawings which form a part of this application, and in which is shown by way of illustration specific embodiments in which the invention can be practiced. These embodiments are described in sufficient detail to enable those skilled in the art to practice the invention, and it is to be understood that other embodiments can be utilized and that various changes can be made without departing from the spirit and scope of the present invention. Moreover, in the detailed description, like numerals are employed to designate like parts throughout the same.

FIGS. 1A and 1B are schematic side views of a system 10 for producing a continuous lenticular image label web 12 according to various aspects of the present invention. A continuous lenticular image web 14 is provided and traverses in a direction indicated by arrow 16 past roller 18 and between nip roller 20*a*—*b*. The image web 14 comprises a continuous lenticular lens web and an interlaced image that has been joined (e.g., printed directly or printed first to a substrate and then subsequently joined) the lens. Printer 21 is schematically shown and identified further illustrating that, prior to passing between nip rollers 20*a*–*b*, an interlaced image (not shown), has been joined to the continuous lenticular lens material to create continuous lenticular image web 14. It should be understood that, prior to printing occurring, continuous lenticular image web 15 is a continuous lenticular lens web (i.e., the web does not comprise an image layer). FIGS. 1A–1B are schematic in nature only.

Still referring to FIGS. 1A–1B, a continuous label release liner 22 (also called a label carrier web) is also provided. As shown, the release liner 22 traverses in a direction indicated by arrow 24 between nip rollers 20*a*–*b* at which point the continuous lenticular image web 14 is joined to the continuous label release liner 22 to form continuous lenticular image label web 12. Web 14 and release liner 22 are joined, as shown, via an adhesive 26. It is to be understood that the particular release liner and adhesive that can be used is one of a number that are known to those of skill in the art. The adhesive can be applied as a layer to one or both (although as a practical matter only one layer is typically required) of the release liner 22, as indicated by arrow 30 (FIG. 1A), or lenticular image web 14, as indicated by arrow 32 (FIG. 1B). Adhesive can be applied using a wide variety of technologies that are known in the art of labeling. For example, a coater can be used. Alternatively, a slot die-type technology can be used to apply a ribbon-type layer of adhesive via a nip to distribute a hot or cold adhesive in a continuous fashion. The joining of the continuous lenticular image web 14 and the release liner 22 creates continuous lenticular image label web 12, which in turn can be wound into a web roll 27 to facilitate storage and/or transport of the label web. In the environment shown, printing occurs "in-line" with the joining of the continuous lenticular image web and continuous release liner web. However, "off-line" printing (for example, as described below) is contemplated and considered within the scope of the present invention.

FIG. 2 is a top view taken along line 2—2 of FIG. 1A showing a portion of the system 10 of FIGS. 1A–B. Viewing FIG. 2 from left to right, or in a direction corresponding to a "web direction", continuous lenticular image web 14 is first shown separate from release liner 22. Adhesive 26, indicated by a dotted pattern, has been applied to the release liner 22. At nip roller 20*a* (or more particularly between the nip created by rollers 20*a*–*b*), the continuous lenticular image web 14 is joined, via adhesive 26, to continuous release liner 22 to created continuous lenticular image web 12, which is then rolled to form continuous lenticular image label web roll 27. A plurality of lenticular labels (described further below) can be constructed from the continuous lenticular image label web.

FIG. 3 is a cross-sectional view of a portion 34 of continuous lenticular image label web 12 taken along line 3—3 of FIG. 2 according to one aspect of the present invention. As shown, the web portion includes several layers. More specifically, the continuous lenticular image label web again includes a continuous label release liner 22 having a top surface 36 and a bottom surface 38. The web further includes a continuous lenticular image web 14 joined to the top surface 36 of the continuous release liner 22 via adhesive layer 40. The continuous lenticular image web itself includes a lenticular lens web layer 42 and an interlaced image layer 44 that is joined (e.g., printed directly) to the lenticular lens web. As a practical matter, other configurations are possible and considered within the scope of the present invention. For example, the arrangement of the system or positioning of various components of the system (shown in FIGS. 1A–1B) can be adjusted so as to result in differing or varied product (e.g., a continuous lenticular image label web where the lenticular image is joined to the bottom surface of the release liner). The adhesive layer can be applied to at least one of the top and the bottom surfaces of the release liner for joining the continuous lenticular image web to the continuous release liner. The adhesive layer can be applied to a bottom surface of the continuous lenticular image web for joining the continuous lenticular image web to the continuous release liner.

FIG. 4 is a schematic side view of another embodiment of a system 50, and FIG. 5 is a top view of the system taken along line 5—5 of FIG. 4, for producing a plurality of lenticular image labels 52 from a continuous lenticular image label web 54 according to another aspect of the present invention. In a manner similar to that depicted in FIGS. 1A–1B, and FIG. 2, a continuous lenticular image web 56 is provided and traverses in a direction indicated by arrow 58 past roller 60 and between nip rollers 62*a*–*b*. A printer 64 is again schematically shown and identified further illustrating that, prior to passing between nip rollers 62*a*–*b*, an interlaced image (not shown), can be joined to the continuous lenticular lens material to create continuous lenticular image web 56. A continuous label release liner 66 (also called a label carrier web) is also provided. As shown, the release liner 66 traverses in a direction indicated by arrow 68 between nip rollers 62*a*–*b* at which point the continuous lenticular image web 56 is joined to the continuous label release liner 66 to form continuous lenticular image label web 54. Web 56 and release liner 66 are joined, as shown, via an adhesive 70. Here again, the joining of the continuous lenticular image web 56 and the release liner 66 creates continuous lenticular image label web 54.

Still referring to FIGS. 4–5, continuous lenticular image web 56 can be cut, and more particularly it can be die cut, using die cutter 72, with this process also being utilized to remove excess lenticular image web 74 (or perhaps simply excess lenticular lens web if no portion of any printed images is removed). The excess image web can be gathered in to excess lenticular web roll 76. What remains is a continuous lenticular image web comprising a plurality of discrete lenticular image labels 78, with each of the plurality still adhering to the continuous release liner material. As the continuous lenticular image web 54 proceeds in a web transport direction, indicated by arrow 78, the web can then be cut or slit using a slitter 80 along longitudinal slits 81 into a plurality of continuous lenticular image web portions 54*a*–*d*, each comprising a plurality of discrete lenticular image labels 52. Continuous lenticular image web portions 54*a*–*d* can be rolled into label rolls (not shown) to facilitate transport and storage. It should be understood that the sizing, spacing and number of lenticular image labels to be created (as well as the continuous lenticular image web from which the labels are created) can vary to convenience. The examples described and illustrated are provided for purposes convenience and understanding, and not for purposes of limiting the invention to any particular number, size or geometry. The labels themselves can, for example, take virtually any shape (e.g., circle, rectangular, triangular, etc.). In the environment shown, printing occurs "in-line" with the joining of the continuous lenticular image web and continuous release liner web, as well as the die-cutting and slitting operations. Here again, printing can be accomplished "off-line" and such "off-line" printing (e.g., described below) is contemplated and considered within the scope of the present invention.

Figure 5A:
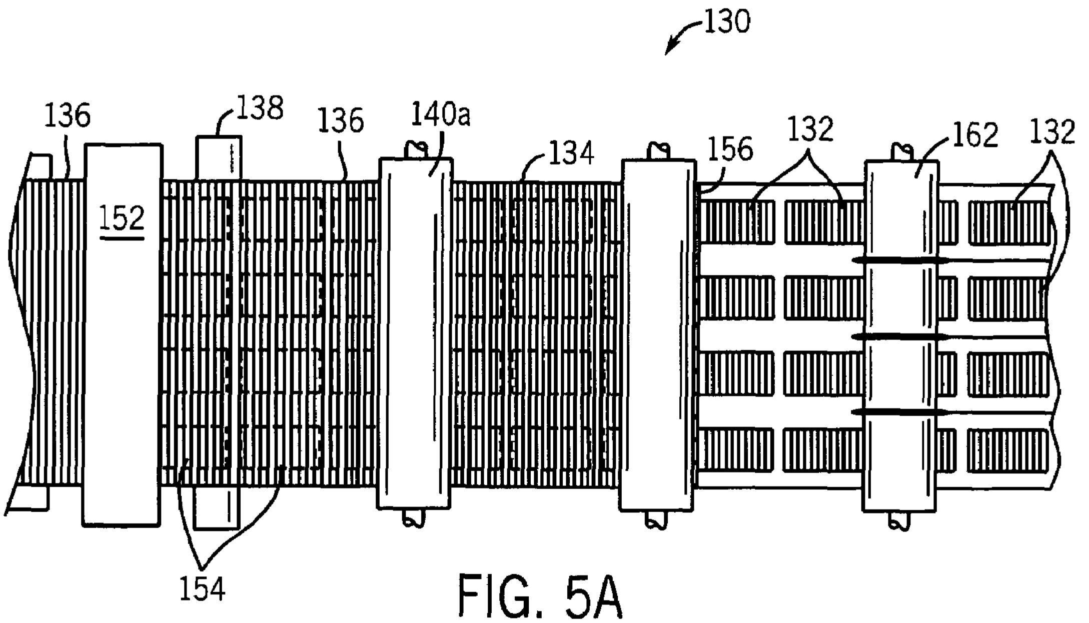
FIG. 5A is a top view taken along line 5*a*—5*a* of FIG. 4*a;*

FIG. 4A is a schematic side view of a system 130 for producing a plurality of lenticular image labels 132 from a continuous lenticular image label web 134 according to another aspect of the present invention. FIG. 5A is a top view taken along line 5*a*—5*a* of FIG. 4A. In a manner similar to that of FIGS. 4 and 5, continuous lenticular image web 136 is provided and traverses in a direction indicated by arrow 137 past roller 138 and between nip rollers 140*a*–*b*. A printer 142 is again schematically shown and identified illustrating that, prior to passing between the nip rollers, an interlaced image can be joined to the web of lenticular lens to created continuous lenticular image web 136. A continuous label release liner 144 (also called a carrier web) is provided. As shown, the release liner 146 traverses in a direction indicated by arrow 148 between nip rollers 140*a*–*b* at which point the continuous lenticular image web 136 is joined to the continuous label release liner 146 to form continuous lenticular image label web 134. Image web 136 and release liner 146 are joined, as shown, via an adhesive 150.

System 13 of FIGS. 4A and 5A is similar to system 50 of FIGS. 4 and 5. However, in FIGS. 4A and 5A, continuous lenticular image web 138 is cut, and preferably die-cut, using die cutter 152. Die-cutting continuous lenticular image web 138 prior to joining the image web with the release liner 146 advantageously allows for the use of a thinner release liner than could be used when die-cutting after the joining action takes place. Following the cutting operation, the lenticular image web is perforated or "nicked" to create discrete, identifiable, but connected lenticular images 154. Subsequent to cutting, excess lenticular image material 156 is gathered, using a roller or other device 158 (schematically illustrated) into excess lenticular web roll 160. Continuous lenticular image web 134 can then proceed to cutter or slitter 162, as described previously, so as to be slit into what will become continuous lenticular image label rolls.

FIG. 6 is a side view taken along line 6—6 of FIG. 4 illustrating excess image web (or perhaps excess lenticular lens web if no portion of any printed image is removed) 74. Voids 75 exist and correspond to the size, shape, and placement of the lenticular image labels previously described. Again, the size shape and placement can vary to convenience, with the exemplary rectangular shape, and four-across, side-by-side placement shown for illustrative purposes only.

FIG. 7 is a cross-sectional view taken along line 7—7 of FIG. 4 showing that the excess lenticular image web 74. Specifically, web 74 includes a continuous lenticular image 56 and an adhesive layer 70. The continuous lenticular image 56 includes continuous lenticular lens 82 and interlaced image 84 joined (e.g., printed directly to) the lenticular lens. More specifically, the interlaced image 84 is printed to the flat back surface 86 of the lens 82, and the adhesive 70 is joined to the interlaced image.

Figure 8:
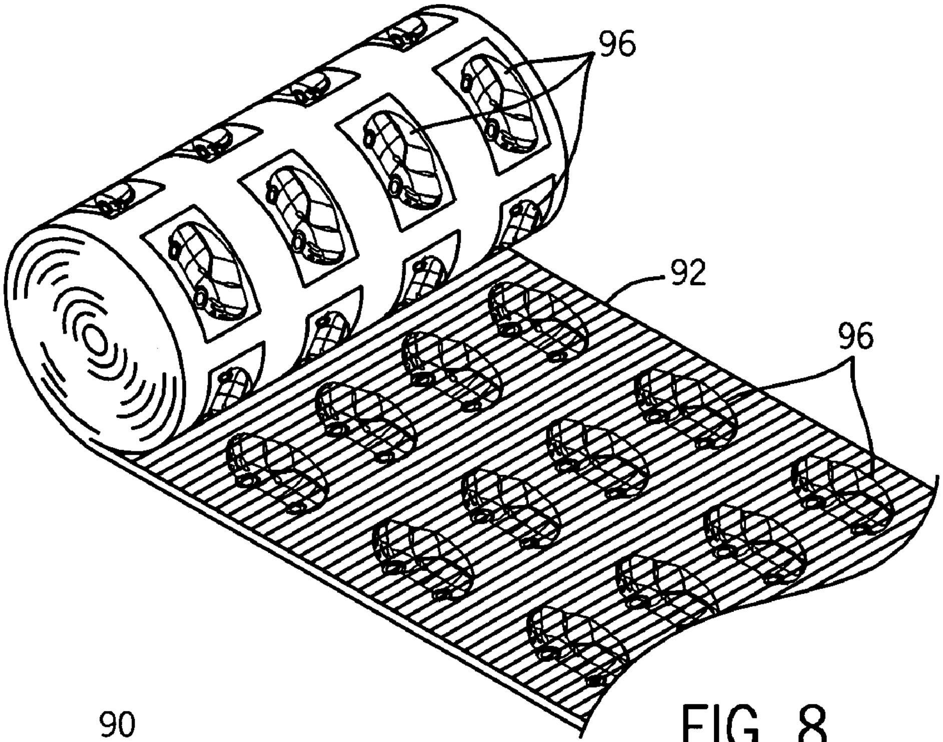
FIG. 8 is a perspective view of a continuous lenticular image web for use with a system for producing a continuous lenticular image label web according to one aspect of the present invention.

FIG. 8 is a perspective view of a continuous lenticular image web 90. As illustrated, the web 90 includes a continuous web of lenticular lens 92, on a surface 94 of which a plurality of discrete images 96 are printed. The images 96 can be viewed through the lens by a viewer and, when so viewed, can impart the desired affect (e.g., motion and/or depth). It should be understood that, while images 96 are illustrated as identical images, the images can vary to convenience. Additionally, the images are schematic in nature in that actual interlaced images are more complex in their appearance as they comprise a plurality of images which have been segmented and interlaced such that, when viewed through the lens, the desired affect is achieved.

Figure 9A:
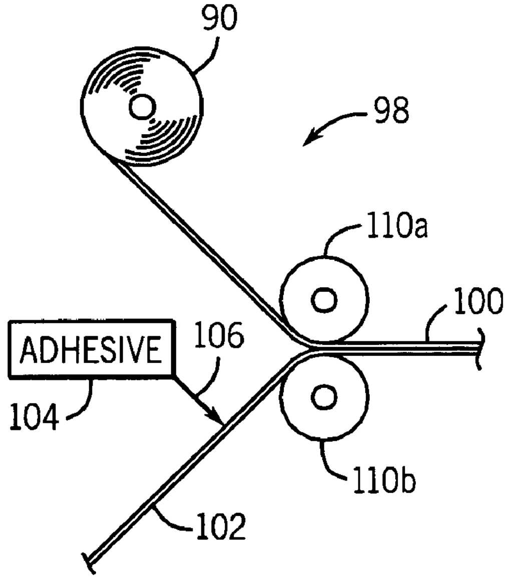
FIG. 9A is a schematic view of a system for applying adhesive to the continuous lenticular image web of FIG. 8 according to one aspect of the present invention.
Figure 9B:
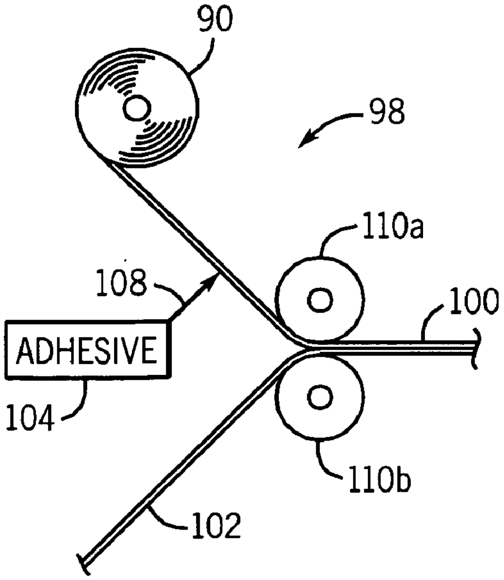
FIG. 9B is a schematic view of a system for applying adhesive to the continuous lenticular image web of FIG. 8 according to another aspect of the present invention.

FIGS. 9A–9B are schematic views of a system 98 for creating a lenticular image label web 100 from the continuous lenticular image web of FIG. 8. Web 90 is provided in a continuous roll form. Additionally, continuous release liner 102 is also provided. As shown in FIG. 9A, adhesive 104 is applied 106 to the continuous release liner 102. As shown in FIG. 9B, adhesive 104 is applied 108 to the continuous lenticular image web 90. Once the adhesive 104 is applied to at least one of the continuous release liner 102 and the continuous lenticular image web 90, the image web and release liner are joined as described previously via nip rollers 110*a*–*b* so as to create continuous lenticular image label web 100. In these embodiments, it can be said that a continuous lenticular image label web is created wherein the continuous lenticular image web comprises an image that is printed via offline printing. In other words, the continuous lenticular image web is “pre-printed” prior to it being provided for use in the present system. As before, the particular type of adhesive can vary to convenience. Label adhesives for use in the present invention include, among others, those adhesives provided by Fasson®, a division of Avery Dennison®, and are generally known in the art.

FIG. 10 is a perspective view a plurality of lenticular image labels 120 and FIG. 11 is a perspective view of a product 124 having one of the plurality of lenticular image labels 120. The labels are created from a continuous lenticular image label web which is shown joined thereto. The labels are created from a continuous lenticular image label web portion 122 created in a manner previously described (see FIG. 5). Stated another way, the lenticular image labels 120 are in a form that can be applied to a finished product. It is contemplated that the “web portion” illustrated in FIG. 10 could in fact comprise the entire label web, depending on the desired end goals and needs of the project at hand. It is further contemplated that the product shown in FIG. 11 is exemplary in nature. The size (e.g., from hand-held or smaller to billboard size or even larger) and shape (e.g., flat, curved, etc.) of the product can and would vary depending on the intended use. Exemplary products include cups, containers, boxes, cosmetic or other cases, signs, packages, and the like. The labels illustrated and described herein can be termed, but should not be limited to, “pressure-sensitive” labels, with such pressure-sensitive technology known generally to those of skill in the general art of labeling.

Still referring to FIGS. 10 and 11, in the embodiment shown, when lenticular image label 120 is applied to product 124, the orientation of the lenticular lens 126 is preferably such that lenticules 128 are positioned substantially vertically (i.e., the lenticules run substantially top-to-bottom). Stated another way, in the instance shown, the lenticules are intended to be oriented substantially parallel with a central longitudinal axis of the product 124. When the lenticular image is oriented in this fashion, “walk-by” viewing of the lenticular image is achieved. In “walk-by” viewing, the point of reference for a viewer with respect to the lenticular image changes. An example of walk-by viewing occurs when a customer walks past an article, such as product 124, that is displayed on a store shelf. Alternatively, it should be understood that the similar result can be achieved when the product 124 bearing the lenticular image label 120 is itself moved (e.g., rotationally or horizontally translated). In walk-by viewing, the viewer perceives changes in the image corresponding to a desired multidimensional effect (e.g., depth, with or without motion). Alternatively, if the lenticular lens were to be positioned, for example, in a horizontal fashion (i.e., rotated substantially 90 degrees with respect to the orientation shown), a viewer would have to move up or down (or the object would be moved up or down) in order to change the point of reference and ultimately perceive the desired visual effect(s).

Thus, one advantage associated with creating and applying lenticular image labels using the method and product shown is to facilitate the ultimate placement and orientation of the labels on an end product. Another advantage of the present invention is that printing, joining, die-cutting and slitting (as well as other operations, such as finishing and label adhering operation not shown) can be completed in-line. In other words, the entire process of creating a plurality of discrete lenticular image labels from a continuous lenticular image label web can occur in a step-by-step, and yet continuous fashion. Moreover, there are discrete, yet significant advantages associated with the present invention. For example, only one layer of adhesive material is required in the production of the continuous lenticular image labels constructed according to the present invention. Moreover, on-serting of lenticular labels is not required. And as noted above, in at least one embodiment, a thinner gauge release liner can be utilized. Since various end-use applications of the lens (e.g., lenticular image labeling) can be facilitated using lenticular lens manufacturing in web format, and in particular, lenticular lens made using a transverse pattern-forming device. A preferred embodiment of the invention includes creating a plurality of lenticular labels using a lenticular lens web (as shown in the Figures) made using a transverse pattern forming device.

In general, while the present invention has been described in terms of preferred embodiments, it is recognized that equivalents, alternatives, and modifications, aside from those expressly stated, are possible and within the scope of the appending claims.

What is claimed is:

1. A method of creating a continuous lenticular image label web, the method comprising:

providing a continuous label release liner having a top surface and a bottom surface;

providing a continuous lenticular image web; and passing the continuous lenticular image web and the continuous release liner between a plurality of nip rollers as to join the continuous lenticular image web to at least one of the top surface and the bottom surface of the continuous release liner, thereby creating a continuous lenticular image label web.

2. The method of claim 1 further comprising applying an adhesive to at least one of the top and the bottom surfaces of the release liner, the adhesive for joining the continuous lenticular image web to the continuous release liner to create the continuous lenticular image label web.

3. The method of claim 1 further comprising applying an adhesive to the bottom surface of the continuous lenticular image web, the adhesive layer for joining the continuous lenticular image web to the continuous release liner to create the continuous lenticular image label web.

4. A method of creating a plurality of lenticular image labels from a continuous lenticular image label web, the method comprising:

providing a continuous label release liner having a top surface and a bottom surface;

providing a continuous lenticular image web;

joining the continuous lenticular image web to at least one of the top surface and the bottom surface of the continuous release liner, thereby creating a continuous lenticular image label web; and cutting at least one of the continuous lenticular image web and the continuous lenticular image label web to create the plurality of lenticular image labels;

wherein cutting is performed prior to joining the continuous lenticular image web to at least one of the top surface and the bottom surface of the continuous release liner.

5. The method of claim 4 wherein the joining is accomplished by passing the continuous lenticular image web and the continuous release liner between a plurality of nip rollers.

6. The method of claim 4 wherein the continuous lenticular image web includes a lenticular lens web made using a transverse lenticular pattern-forming device.

7. A product comprising a lenticular image label obtained from a continuous lenticular image label web made by the method of claim 4.

8. A method of creating a plurality of lenticular image labels from a continuous lenticular image label web, the method comprising:

providing a continuous label release liner having a top surface and a bottom surface;

providing a continuous lenticular image web;

joining the continuous lenticular image web to at least one of the top surface and the bottom surface of the continuous release liner, thereby creating a continuous lenticular image label web; and cutting at least one of the continuous lenticular image web and the continuous lenticular image label web to create the plurality of lenticular image labels;

wherein the joining is accomplished by passing the continuous lenticular image web and the continuous release liner between a plurality of nip rollers; and wherein the cutting is performed either prior to or after joining the continuous lenticular image web to at least one of the top surface and the bottom surface of the continuous release liner.

9. The method of claim 8 further comprising applying an adhesive to at least one of the top and the bottom surfaces of the release liner, the adhesive for joining the continuous lenticular image web to the continuous release liner to create the continuous lenticular image label web.

10. The method of claim 8 wherein any on-serting of any of the plurality of lenticular image labels is not required.

11. The method of claim 8 wherein any on-serting of any of the plurality of lenticular image labels is eliminated.

12. The method of claim 8 further comprising orienting, without on-serting, the plurality of lenticular image labels in a desired orientation.

* * * * *